Oct. 31, 1950     R. L. SLOTTER ET AL     2,527,585
WET MILLING OF GRAIN SORGHUM

Filed April 20, 1948                2 Sheets-Sheet 1

Fig. 2.

FLOWSHEET OF OPERATIONS INVOLVED IN PEARLING
Grain Sorghum
Grain used: Commercial Martin Milo C.DD 5446
Amount of grain used: 9928 gm.
Amount of foreign material. etc. 578 gm. or 5.8%
Cleaned grain (9350 gm. or 94.2%)
|
Strong Scott Barley Pearler

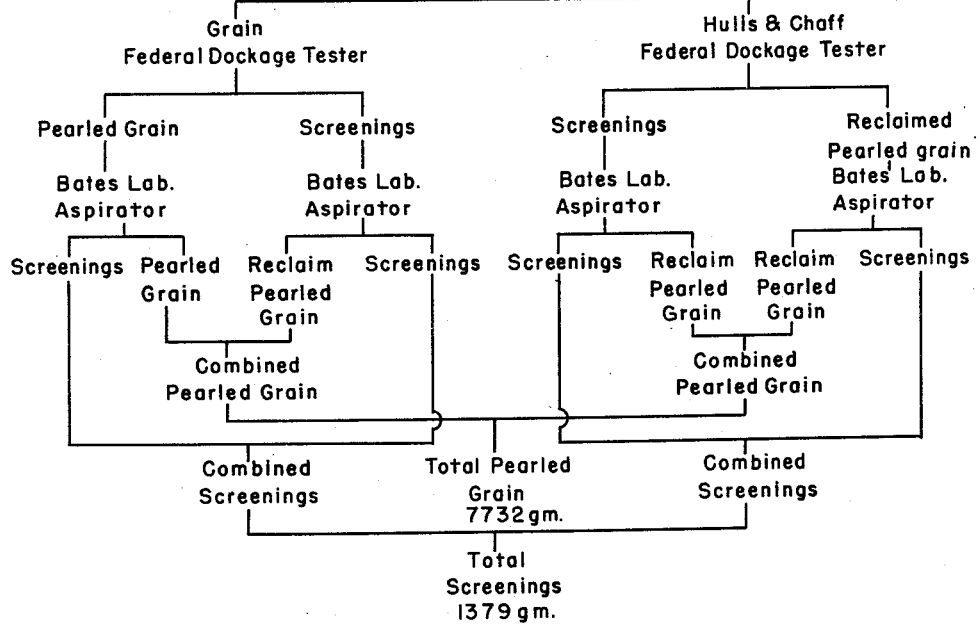

Total pearled grain: 7732 gm. or 82.7% of cleaned grain input
Total screenings:   1379 gm. or 14.7% of cleaned grain input
Loss on pearling:    239 gm. or 2.6% of cleaned grain input

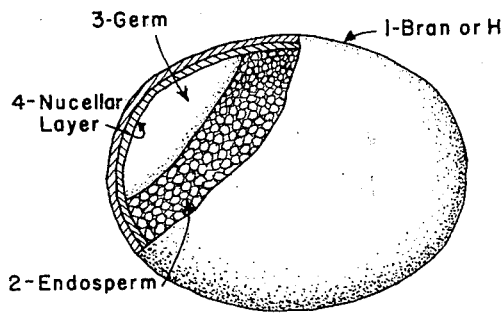

Fig. 1.

INVENTORS
R. L. SLOTTER
R. A. ANDERSON

BY  *J. A. Seegrist*

ATTORNEY

PROPOSED FLOWSHEET FOR WET MILLING PEARLED GRAIN SORGHUM

Patented Oct. 31, 1950

2,527,585

UNITED STATES PATENT OFFICE 2,527,585

WET MILLING OF GRAIN SORGHUM

Richard L. Slotter, Minneapolis, Minn., and Roy A. Anderson, Peoria, Ill., assignors to the United States of America as represented by the Secretary of Agriculture Application April 20, 1948, Serial No. 22,232

3 Claims. (Cl. 127—68)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to a process for the wet milling of grain sorghum, and more particularly to a process for the recovery of improved starch and protein fractions as well as valuable byproducts from grain sorghum.

This invention has among its objects the production of a white starch having a minimum protein content by a wet milling process which follows the principles of the corn wet milling method for corn.

Grain sorghum has become an important crop in the Southwest particularly due to the drought resistance of the crop. In recent years, varieties have been developed which may be harvested with the combine and this grain has potentialities of being an important source of nutritious human and stock food.

Nearly all varieties of grain sorghum now being produced in quantities have many milling disadvantages, one of which is the colored hull surrounding the grains. When subjected to conventional wet milling operations for recovering starch and protein, the color carried by the hull permeates the kernel during the steeping period. The resulting starch is of low quality and is practically always colored with varying shades of yellow, red, or purple. The color is actually imparted in varying degrees to all the other milling products.

A further object of this invention is the provision of a process whereby the sorghum hull is removed prior to wet milling, making possible a better separation of improved starch and protein fractions as well as increased oil recovery from the germ and the recovery of a byproduct, carnauba-like wax from the hulls.

These and other objects will be apparent to those skilled in the art from the following specification.

We have discovered that the hull of grain sorghum may be removed efficiently by a dehulling operation, and that the dehulled grain responds much more satisfactorily to wet milling operations than does the whole grain. The amount of coarse fiber is greatly reduced and hence the loads on the coarse fiber milling screens are correspondingly reduced. The germ separation is very efficient and the germ fraction is of unusually high purity. Two and sometimes three times as much germ floats to the top of the slurry from dehulled grain compared with the slurry from whole grain which normally contains a substantial amount of associated hulls. Moreover, the oil content of the germ fraction is greater and a better colored oil is obtained. The steep water is lighter in color and makes lighter colored more desirable feeds.

In addition to the above advantages, the tabling efficiencies of the dehulled grain are increased. The starch has an average protein content of less than 0.75 percent and the gluten averages about 50 percent protein or about 6–7 percent more than is found in gluten recovered when whole grain is used. The starch has an acceptable white color and its yield is increased in strong contrast to the lower yields of highly colored poor quality starches from whole grain.

An additional advantage gained through the dehulling of the grain sorghum prior to wet milling is in the greatly facilitated recovery of the carnauba-like wax associated with the hulls. Prior workers have recovered this wax experimentally by solvent extracting the whole grain. In accordance with our invention, only the hull fraction or usually less than 20 percent by weight of the total material needed be treated for wax recovery.

The hulls are removed by pearling the grain in conventional pearling machinery. We have found a plurality of devices suitable for removing the hulls, among which are conventional barley pearlers or rice pearlers. In these we have found that screen sizes and the coarseness of abrasive disks or sheets may need to be varied slightly to obtain optimum hull removal. As a general rule, satisfactory results are obtained with only slight variations, all of which are well within the scope of variation and adjustment of the individual machine.

The term "pearling" refers to a process for removing the outer layer of whole grain by abrasion, in such a way that the grains themselves are not disintegrated.

The grain should have a moisture content of about 8 to 14 percent and usually requires a retention time (in a Strong-Scott barley pearler) of 10 to 15 seconds for satisfactory dehulling.

The hull removing action results in about 80 to 85 percent recovery as dehulled sorghum and about 15 to 20 percent as hulls. The removed hulls may be directly extracted with a wax solvent such as hexane for the recovery of the associated wax. This usually amounts to about 5 to 10 percent of the weight of the hulls. The above data refer to cleaned commercial grain sorghum and may vary considerably with the individual variety of sorghum and the uniformity of the grains.

The invention may be more clearly understood by reference to the accompanying drawings.

Figure 1 shows a cross-section of a typical sorghum kernel.

Figure 2 shows a flowsheet for the dehulling operation.

Figure 3:
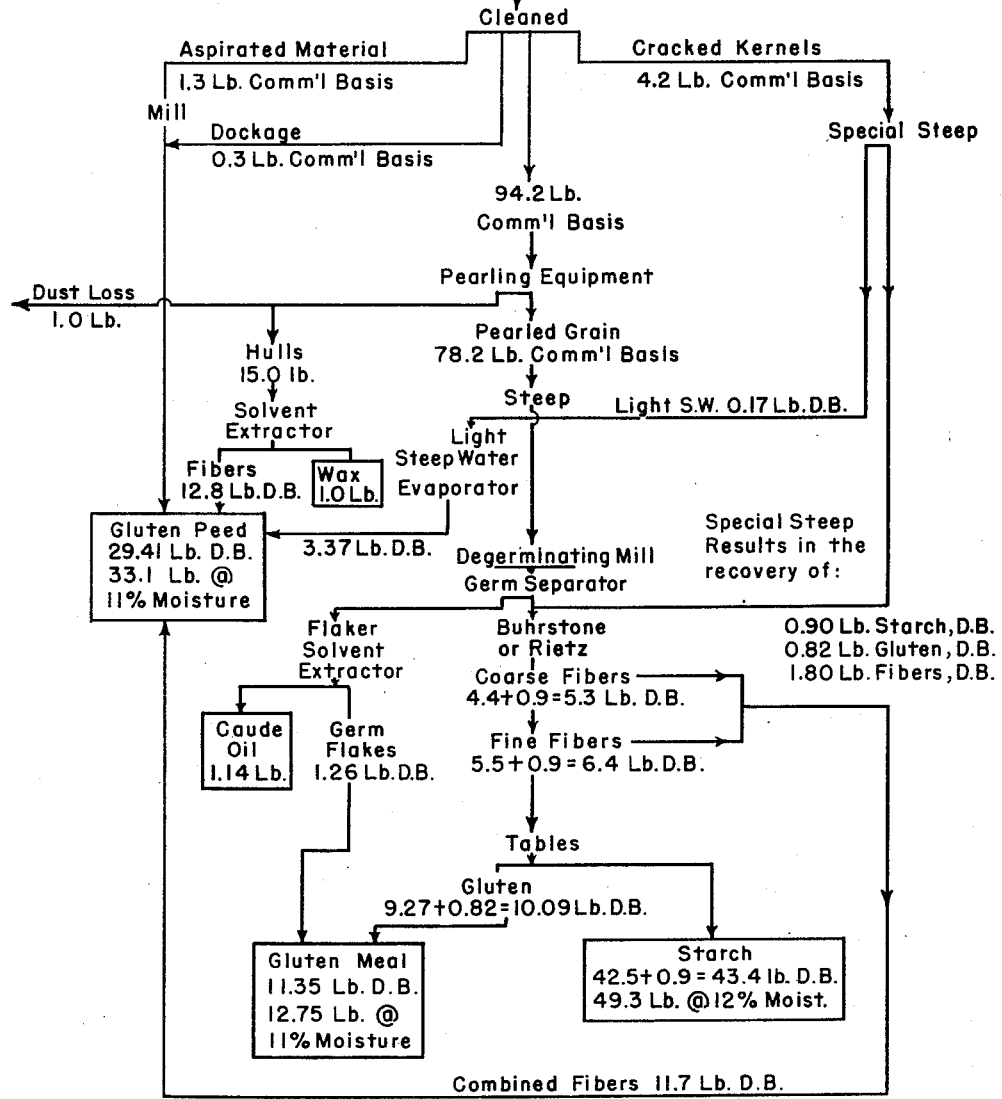
Figure 3 shows a flowsheet for wet milling dehulled grain sorghum.

Referring to Figure 1, which shows a section of the sorghum kernel taken through the germ, 1 denotes the hull surrounding the grain. This hull contains the coloring matter and the carnauba-like wax referred to previously. It clings more or less tenaciously to the endosperm and to the germ 3 and is composed chiefly of cellulosic fiber. The endosperm 2 comprises minor amounts of fiber, and contains the starch and protein. The germ 3 likewise comprises minor amounts of fiber. It contains the oil, which makes up half or more of its weight. Some varieties of sorghum also contain a colored nucellar layer 4.

Figure 2 is self-explanatory, and illustrates a typical flowsheet for the dehulling operation employing a conventional barley pearler. It will be noted that the operation is a fairly simple one involving only the simple subsidiary steps of aspiration and screening.

Figure 3 is likewise self-explanatory. It illustrates a typical wet milling process into which the dehulling operation such as shown in Figure 2 has been integrated. It will be noted that the process is very similar to the conventional wet milling of corn.

In the dehulling procedure according to this invention, the coloring matter is removed along with the hulls. In the main it is associated with the hull itself, but appreciable amounts may also be present in the nucellar layer. This layer is substantially removed during pearling or other dehulling operations.

The following specific examples illustrate the invention. They are not to be considered limiting. Parts given are by weight unless otherwise specified.

*Example 1*

Commercial Martin Milo grain sorghum is cleaned of foreign material. The cleaning operation yields a 94.2 percent recovery of cleaned grain. The cleaned grain (9,350 parts) is dehulled by means of a Strong-Scott barley pearler in accordance with the flowsheet of Figure 2. The operation yielded a total of 7,732 parts dehulled grain and 1,379 parts screenings. The loss in dust and unrecoverables amounted to 2.6 percent or 239 parts.

The screenings were extracted with hexane to recover about 7 percent of their weight as a crude carnauba-like wax.

The dehulled grain was then subjected to a wet milling process in accordance with that shown in Figure 3. In six runs the starch recovery ranged from 76 to 79 percent of the total starch in the dehulled grain. The gluten fraction averaged 55 percent protein. The starch was of excellent quality, white, and tabled well.

*Example 2*

The procedure of Example 1 was repeated using Martin Milo certified seed that had been dehulled. Starch recovery ranged from 73 to 77 percent. The gluten fraction averaged 44 percent protein. As in Example 1, the starch was of excellent quality, white in color, and separated cleanly on the tables.

In contrast to the above examples, whole grain Martin Milo was put through a similar wet milling process. The starch recovery averaged 76 percent of the starch present in the original grain in the case of commercial grain and 73 percent in the case of certified seed. The gluten fractions contained on the average 49 percent protein with commercial grain and about 37 percent in the case of certified seed. The differences in quality of both the starch and gluten fractions in these last instances are striking in that the starch is of relatively poor quality and contains coloring matter. The gluten is considerably richer in protein in the process using dehulled grain.

The advantage of the dehulling operation is apparent from the above examples. In addition to these main advantages, the additional advantage of increased oil content of the germ fraction is pronounced. The oil in the germ fraction of commercial whole grain averaged 41 percent, while using dehulled grain it was 44 percent. Whole certified seed gave a germ fraction averaging 44 percent oil, whereas the same grain dehulled gave a fraction averaging 51 percent.

The moisture content of the grain used is preferably within the range of 8 to 14 percent. This range is preferred for practical reasons, and since it is characteristic of good quality commercial grains, it is pointed out to illustrate that no special tempering of the grain is necessary for optimum results. Grain having either a higher or lower moisture content may be dehulled, nevertheless, in accordance with our invention.

Having thus described the invention, what is claimed is:

1. In a process for the wet milling of grain sorghum, the improvement which comprises removing the outer hull of the grain, without disintegrating said grain, separating the dehulled undisintegrated grain from the hulls and wet milling the separated grain.

2. In a process for the wet milling of grain sorghum, the improvement which comprises removing the outer hull from the grain by a pearling operation, separating the pearled grain from the hulls, steeping, degerminating, disintegrating the degermed grain to separate the starch granules from the gluten into a slurry and tabling the slurry to separate the starch from the gluten.

3. The process of claim 1 in which the grain sorghum is dehulled at an initial moisture content in the range of 8 to 14 percent.

RICHARD L. SLOTTER.
ROY A. ANDERSON.

REFERENCES CITED

The following references are of record in the file of this patent:

UNITED STATES PATENTS

| Number | Name | Date |
|---|---|---|
| 134,443 | Sezille | Dec. 31, 1872 |
| 341,282 | Schuman | May 4, 1886 |
| 2,089,404 | Newkirk | Aug. 10, 1937 |
| 2,428,813 | Rhodes | Oct. 14, 1947 |
| 2,459,548 | Singer et al. | Jan. 18, 1949 |
| 2,472,971 | Hansen | June 14, 1949 |

OTHER REFERENCES

Chem. and Met. Eng., November 1942, pages 113–115 (page 114 pertinent), "Middle West Contributes New Starch Supplies."